US011498122B2

(12) United States Patent
Watanabe et al.

(10) Patent No.: US 11,498,122 B2
(45) Date of Patent: Nov. 15, 2022

(54) PURE COPPER POWDER HAVING SI COATING AND PRODUCTION METHOD THEREOF, AND ADDITIVE MANUFACTURED OBJECT USING SAID PURE COPPER POWDER

(71) Applicant: JX Nippon Mining & Metals Corporation, Tokyo (JP)

(72) Inventors: Hirofumi Watanabe, Ibaraki (JP); Hiroyoshi Yamamoto, Ibaraki (JP); Yoshitaka Shibuya, Ibaraki (JP)

(73) Assignee: JX NIPPON MINING & METALS CORPORATION, Tokyo (JP)

( * ) Notice: Subject to any disclaimer, the term of this patent is extended or adjusted under 35 U.S.C. 154(b) by 106 days.

(21) Appl. No.: 16/968,960

(22) PCT Filed: Dec. 26, 2019

(86) PCT No.: PCT/JP2019/051092
§ 371 (c)(1),
(2) Date: Aug. 11, 2020

(87) PCT Pub. No.: WO2020/138273
PCT Pub. Date: Jul. 2, 2020

(65) Prior Publication Data
US 2021/0053114 A1 Feb. 25, 2021

(30) Foreign Application Priority Data

Dec. 27, 2018 (JP) .............................. JP2018-244933
Sep. 5, 2019 (JP) .............................. JP2019-162389
Nov. 8, 2019 (JP) .............................. JP2019-203379

(51) Int. Cl.
*B22F 1/102* (2022.01)

(52) U.S. Cl.
CPC .......... *B22F 1/102* (2022.01); *B22F 2301/10* (2013.01); *B22F 2304/10* (2013.01)

(58) Field of Classification Search
None
See application file for complete search history.

(56) References Cited

U.S. PATENT DOCUMENTS

2013/0029041 A1    1/2013 Kim et al.
2016/0230026 A1*   8/2016 Furusawa ................. B22F 1/10
(Continued)

FOREIGN PATENT DOCUMENTS

EP    3412379 A1    12/2018
JP    S57-155386 A    9/1982
(Continued)

OTHER PUBLICATIONS

Machine translation of Kurosaki et al. (JP 2017-025392) via JPO translated Jan. 19, 2022 (Year: 2017).*

(Continued)

*Primary Examiner* — Elizabeth Collister
(74) *Attorney, Agent, or Firm* — Howson & Howson LLP

(57) ABSTRACT

A pure copper powder with a Si coating formed thereon, wherein a Si adhesion amount is 5 wtppm or more and 200 wtppm or less, a C adhesion amount is 15 wtppm or more, and a weight ratio C/Si is 3 or less. An object of the present invention is to provide a pure copper powder with a Si coating formed thereon and a production method thereof, as well as an additive manufactured object using such pure copper powder capable of suppressing the partial sintering of the pure copper powder caused by the preheating thereof in additive manufacturing based on the electron beam (EB) method, and suppressing the loss of the degree of vacuum caused by carbon (C) during the molding process.

18 Claims, 2 Drawing Sheets

— 20μm

(56) References Cited

U.S. PATENT DOCUMENTS

2017/0043395 A1    2/2017  She et al.
2021/0178465 A1    6/2021  Endo et al.

FOREIGN PATENT DOCUMENTS

| JP | 2008-101245 A | | 5/2008 | |
|----|---------------|---|--------|---|
| JP | 2013-171745 A | | 9/2013 | |
| JP | 2017-025392 A | | 2/2017 | |
| JP | 2017-036508 A | | 2/2017 | |
| JP | 2018178239 A | * | 11/2018 | ............ B22F 1/0003 |
| JP | 2018-199862 A | | 12/2018 | |
| JP | 2019-173058 A | | 10/2019 | |
| WO | 2018/079002 A1 | | 5/2018 | |

OTHER PUBLICATIONS

Extended European Search Report issued in EP Patent Application No. 19902333.4 dated Oct. 11, 2021.
Lodes et al., "Process Development for the Manufacturing of 99.94% Pure Copper via Selective Electron Beam Melting", Materials Letters, vol. 143 pp. 298-301, Dec. 2014.
Extended European Search Report issued in EP Patent Application No. 19903905.8 dated Sep. 15, 2021.

* cited by examiner

— 20μm

— 20μm

PURE COPPER POWDER HAVING Si COATING AND PRODUCTION METHOD THEREOF, AND ADDITIVE MANUFACTURED OBJECT USING SAID PURE COPPER POWDER

BACKGROUND

The present invention relates to a pure copper powder having a Si coating and a production method thereof, and to an additive manufactured object using such pure copper powder.

BACKGROUND ART

In recent years, attempts are being made for using 3D printer technology and producing three-dimensional structure metal components having a complex shape and deemed difficult to mold. 3D printing is also referred to as additive manufacturing (AM), and is a method of producing a complex-shape metal molded object by thinly spreading a metal powder on a substrate to form a metal powder layer, melting the metal powder layer by scanning the metal powder layer with an electron beam or a laser beam and subsequently solidifying the metal powder layer, further thinly spreading a new powder thereon and similarly melting and solidifying, and repeating these processes.

In additive manufacturing based on the electron beam (EB) method, when the metal powder is irradiated with an electron beam, in certain cases the metal powder becomes charged up since it has high electrical resistance. Thus, in order to resolve the foregoing problem, the metal powder is preheated and adjacent metal powders are necked to create a conductive path. Nevertheless, in the foregoing case, the metal powder becomes partially sintered due to the preheating process and, when the sintering advances, there is a problem in that it becomes difficult for the powder to escape from within the holes of the molded object.

Such being the case, in order to suppress sintering and achieve the weakest necking possible, Patent Document 1 discloses a surface-treated metal powder. Specifically, by forming an organic coating on the surface of a metal powder by using a silane coupling agent or the like, the metal powder, in a layered state, can be directly irradiated with an electron beam without being partially sintered due to the preheating process.

CITATION LIST

Patent Documents

[Patent Document 1] Japanese Unexamined Patent Application Publication No. 2017-25392

SUMMARY

An object of the present invention is to provide a pure copper powder with a Si coating formed thereon and a production method thereof, as well as an additive manufactured object using such pure copper powder capable of suppressing the partial sintering of the pure copper powder caused by the preheating thereof in additive manufacturing based on the electron beam (EB) method, and suppressing the loss of the degree of vacuum caused by carbon (C) during the molding process.

As a means for achieving the foregoing objects, the present invention provides the following embodiments.

1) A pure copper powder with a Si coating formed thereon, wherein a Si adhesion amount is 5 wtppm or more and 200 wtppm or less, a C adhesion amount is 15 wtppm or more, and a weight ratio C/Si of the Si adhesion amount and the C adhesion amount is 3 or less.
2) A pure copper powder with a Si coating formed thereon, wherein, when Si is analyzed via WDX analysis, portions that are 1/10 or more of a maximum signal strength are 40% or higher of a whole particle, a C adhesion amount is 15 wtppm or more, and a weight ratio C/Si of a Si adhesion amount and a C adhesion amount is 3 or less.
3) A pure copper powder with a Si coating formed thereon, wherein a film thickness of the Si coating is 5 nm or more and 300 nm or less, a C adhesion amount is 15 wtppm or more, and a weight ratio C/Si of a Si adhesion amount and a C adhesion amount is 3 or less.
4) The pure copper powder according to any one of 1) to 3) above, wherein an oxygen concentration in the pure copper powder is 1000 wtppm or less.
5) The pure copper powder according to any one of 1) to 4) above, wherein an average particle size D50 (median diameter) of the pure copper powder is 10 μm or more and 150 μm or less.

The present invention additionally provides the following embodiment.

6) A production method of the pure copper powder according to any one of 1) to 5) above, wherein a pure copper powder is immersed in a solution containing a silane-based coupling agent, and, after forming a Si coating on the pure copper powder, the pure copper powder is heated at 1000° C. or less.

The present invention additionally provides the following embodiments.

7) A pure copper additive manufactured object having a relative density of 95% or higher.
8) The pure copper additive manufactured object according to 7) above, wherein a Si concentration in the additive manufactured object is 5 wtppm or more and 200 wtppm or less.
9) A pure copper additive manufactured object produced based on an additive manufacturing method with the pure copper powder according to any one of 1) to 5) above as a raw material.

According to the present invention, it is possible to suppress the partial sintering of the pure copper powder caused by the preheating thereof in additive manufacturing based on the electron beam (EB) method, and suppress the loss of the degree of vacuum caused by carbon (C) during the molding process.

DETAILED DESCRIPTION

Figure 1:
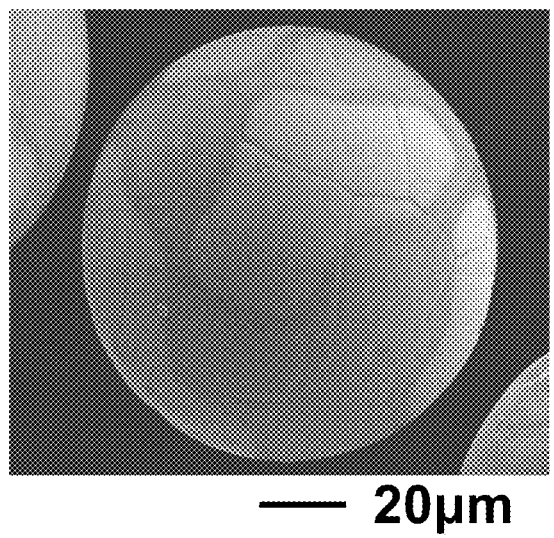
FIG. 1 is an SEM image of the pure copper powder with a Si coating formed thereon of Example 1-2.
Figure 2:
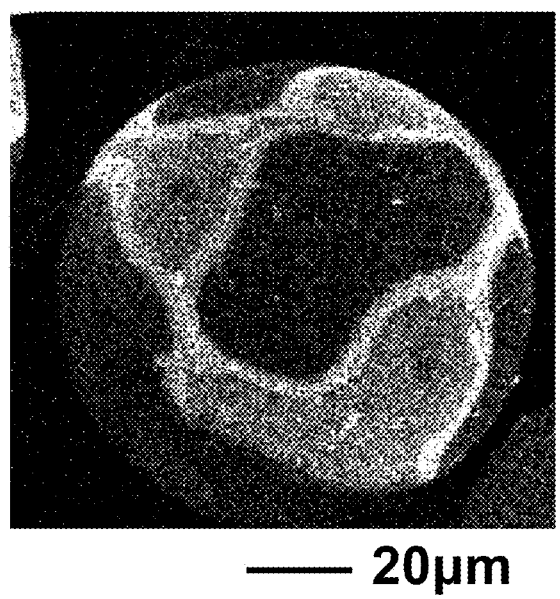
FIG. 2 is a mapping image of Si based on WDX (Wavelength Dispersive X-ray) of Example 1-2.
Figure 3:
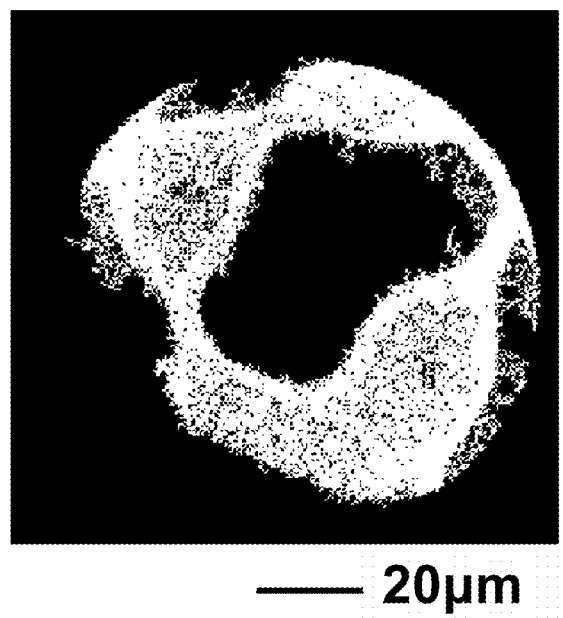
FIG. 3 is an image showing the part corresponding to the coverage in the Si mapping of Example 1-2.

A metal powder that is used in additive manufacturing based on the electron beam (EB) method is normally preheated for suppressing a charge-up among other reasons. While preheating is performed at a relatively low temperature, there is a problem in that the metal powder becomes partially sintered and necked, it becomes difficult to remove the metal powder remaining in the molded object and, even if it is possible to remove such remaining metal powder, it is not possible to reuse the removed metal powder.

In light of the above, the metal powder is subject to surface treatment so that it will not become partially sintered even when preheated. For example, Patent Document 1 discloses a technology of performing surface treatment to a metal powder using diaminosilane, aminotitanate or other organic matter, and thereby forming a coating of Si or Ti on the surface of the metal powder, and the formation of this kind of coating is effective for suppressing the partial sintering of the metal powder caused by the preheating thereof.

When forming a Si coating based on surface treatment using the organic matter described above, organic matter (C) will also become attached at the same time, and when using a pure copper powder to which such organic matter has become attached, there will be a loss of a degree of vacuum during additive manufacturing, and the molding conditions will become unstable. Furthermore, there were also cases where a part of the organic matter would become decomposed due to the heat during the molding process, become gasified, and generate an unusual odor.

As a result of intense study of the foregoing problems, the present inventors discovered that the loss of the degree of vacuum during additive manufacturing occurs when the ratio of C relative to Si exceeds a predetermined range. The present inventors also discovered that, by performing heat treatment to a surface-treated pure copper powder under certain conditions, it is possible to suppress the ratio of C that becomes attached to the pure copper powder to be within a certain range, and thereby suppress the loss of the degree of vacuum. In light of the foregoing circumstances, the present inventors hereby provide a pure copper powder with a Si coating formed thereon which can suppress the loss of the degree of vacuum during the molding process.

A pure copper powder according to an embodiment of the present invention is a pure copper powder with a Si coating formed thereon, wherein the Si adhesion amount is 5 wtppm or more and 200 wtppm or less, the C adhesion amount is 15 wtppm or more, and the weight ratio C/Si is 3 or less. By forming a Si coating of the foregoing adhesion amount on the surface of the pure copper powder, it is possible to suppress the partial sintering of the pure copper powder caused by preheating or other reasons, and produce an additive manufactured object having a high density and a hollow structure.

When the adhesion amount of Si is less than 5 wtppm, it is not possible to sufficiently suppress the partial sintering of the pure copper powder. When the adhesion amount of Si exceeds 200 wtppm, this may result in the deterioration of the conductivity or density of the molded object and, therefore, the adhesion amount of Si is preferably 200 wtppm or less.

Note that, in this disclosure, the term "hollow structure" refers to a structure having a space within a three-dimensional molded object, or in which the inside of a three-dimensional molded object is penetrated.

In another embodiment of the present invention, used as the pure copper powder is a pure copper powder with a Si coating formed thereon in which, when Si is analyzed via WDX analysis, portions that are $1/10$ or more of a maximum signal strength are 40% or higher of a whole particle, a C adhesion amount is 15 wtppm or more, and a weight ratio C/Si of a Si adhesion amount and a C adhesion amount is 3 or less.

Since WDX (Wavelength Dispersive X-ray) analysis is able to identify the existence of the Si element in the pure copper powder in terms of where and how much, it can be used as an index of the coverage of Si which is coating the pure copper powder. Here, "portions that are $1/10$ or more of a maximum signal strength" mean the area obtained by excluding portions that are less than $1/10$ of the maximum signal strength detected by a detector upon analyzing the pure copper powder via WDX. For example, when the signal strength upon scanning a whole particle is 15 to 400, the corresponding area will be the portions having a signal strength of 40 to 400.

When the Si coverage is less than 40%, the necked part caused by the partial sintering upon performing the preheating process will increase, heat will escape to the peripheral pure copper powder through the necking during the EB thermal spraying, and there are cases where the melting of the pure copper powder becomes difficult.

In another embodiment of the present invention, used as the pure copper powder is a pure copper powder with a Si coating formed thereon in which a film thickness of the Si coating is 5 nm or more and 300 nm or less, a C adhesion amount is 15 wtppm or more, and a weight ratio C/Si of a Si adhesion amount and a C adhesion amount is 3 or less. Here, the film thickness of the coating is a value obtained by sputtering the powder body surface at a fixed sputter rate and detecting the Auger electrons based on Auger Electron Spectroscopy (AES), and is calculated from the time and sputter rate required until Si is no longer detected. Two points are randomly selected as the locations to be detected from a single particle, and the value of the Examples represent the average value thereof. When the film thickness of the coating is less than 5 nm, it is not possible to suppress the partial sintering of the pure copper powder during the preheating thereof. When the film thickness of the coating is more than 300 nm, it is difficult to form a necking, which in turn causes a charge-up, and, therefore, the film thickness of the coating is preferably 5 nm or more and 300 nm or less. While a case of forming a Si coating on the pure copper powder was explained above, similar effects can be expected when forming a Ti coating on the pure copper powder.

In an embodiment of the present invention, the oxygen concentration in the pure copper powder is preferably 1000 wtppm or less, and more preferably 500 wtppm or less. While there are cases where pores are formed within the molded object due to the gasification of oxygen or oxides in the pure copper powder during the molding process, by reducing the oxygen concentration in the pure copper powder, it is possible to suppress the formation of such pores and obtain a high-density molded object.

In an embodiment of the present invention, the average particle size D50 (median diameter) of the pure copper powder is preferably 10 μm or more and 150 μm or less. When the average particle size D50 is 10 μm or more, the powder does not float easily during the molding process, and it becomes easier to handle the powder. Meanwhile, by causing the average particle size D50 to be 150 μm or less, it becomes easier to produce a further highly refined additive manufactured object. Note that, in the embodiments of the present invention, the term "average particle size D50" means the average particle size at an integrated value of 50% in a particle size distribution measured based on image analysis.

In an embodiment of the present invention, the pure copper powder preferably has a purity of 99.9% or higher. Since pure copper has high thermal conductivity, it is possible to produce a molded object having superior thermal conductivity by producing a complex shape having a hollow structure, which could not be conventionally produced, via additive manufacturing. Moreover, when the density of the molded object is low, the thermal conductivity will also be low since substances (such as air) with inferior thermal conductivity will get mixed into the molded object. However, when using the pure copper powder according to an embodiment of the present invention, it is possible to produce an additive manufactured object having a relative density of 95% or higher.

The production method of the pure copper powder according to an embodiment of the present invention is now explained.

Foremost, a required amount of a pure copper powder is prepared. A pure copper powder having an average particle size D50 (median diameter) of 10 to 150 μm is preferably used. The intended average particle size can be obtained via sieving. While the pure copper powder can be prepared via the atomization method, the pure copper powder according to an embodiment of the present invention may also be prepared via other methods, and is not limited to the atomization method.

Next, pretreatment of the pure copper powder is performed. Since a natural oxide film is normally formed on the pure copper powder, there are cases where it is difficult to form the intended bond. Accordingly, it is preferable to eliminate (pickling) the oxide film in advance. As the method of removal, for example, in the case of a copper powder, the natural oxide film can be removed by immersing the copper powder in a dilute sulfuric acid aqueous solution. However, this pretreatment is a treatment that is performed for the pure copper powder on which a natural oxide film is formed, and there is no need to perform this pretreatment to all pure copper powders. After pickling, the pure copper powder may also be washed with pure water as needed.

Next, in order to form a Si coating on the surface of the pure copper powder, the pure copper powder is immersed in a solution containing a silane coupling agent. The solution temperature (surface treatment temperature) is preferably set to 5 to 80° C. When the solution temperature is less than 5° C., the Si coverage will decrease. Moreover, since the adhesion amount of Si that will become attached will increase as the immersion time becomes longer, it is preferable to adjust the immersion time according to the intended adhesion amount of Si.

As the silane coupling agent, any commercially available silane coupling agent may be used; for instance, aminosilane, vinylsilane, epoxysilane, mercaptosilane, methacrylsilane, ureidosilane, alkylsilane, carboxy group-containing silane or the like may be used.

While an aqueous solution of 0.1 to 30% obtained by diluting the foregoing solution with pure water may be used, since the adhesion amount of Si will increase as the concentration of the solution is higher, it is preferable to adjust the concentration according to the intended adhesion amount of Si. Moreover, the foregoing surface treatment may be performed by agitating the solution as needed.

After the immersion treatment, the pure copper powder is heated in a vacuum or an atmosphere to cause a coupling reaction, and thereafter dried to form a Si coating. The heating temperature will differ depending on the coupling agent that is used, and, for example, may be set to 70° C. to 120° C.

Next, the pure copper powder with a Si coating formed thereon is subject to heat treatment to moderately remove organic matter. The heat treatment temperature may be set to attain the intended weight ratio C/Si, and the heat treatment temperature is desirably set higher when the amount of Si is great and the heat treatment temperature is desirably set lower when the amount of Si is small, and, for example, the heating temperature may be set to be 400° C. or higher and 1000° C. or less. When the heating temperature is less than 400° C., it is not possible to sufficiently remove organic matter, which in turn may cause deterioration in the degree of vacuum during molding and contamination. When the heating temperature exceeds 1000° C., the sintering will advance quickly and it is not possible to maintain the state of a powder. Moreover, heating can be performed in a vacuum (roughly $10^{-3}$ Pa). Furthermore, the heating time may also be adjusted in addition to the temperature to attain the intended weight ratio C/Si and, for example, the heating time may be preferably set to 2 to 12 hours.

Based on the foregoing process, it is possible to obtain a pure copper powder with a Si coating formed thereon and having the intended Si adhesion amount, coverage, film thickness, C adhesion amount, and weight ratio C/Si.

The molding process and evaluation method according to the embodiments of the present invention, including the Examples and Comparative Examples, are as follows.
(Production of Metal Additive Manufactured Object)
Manufacturer: Arcam
Name of device: A2X
Molding conditions: preheating temperature: 300° C. to 1600° C.
Degree of vacuum: $1\times10^{-2}$ mBar
Additive manufactured object: An additive manufactured object having a size of 35 mm×35 mm and a thickness of 35 mm, and a tubular hollow structure having a diameter of 3 mm at the center thereof was produced.
(Average Particle Size D50)
The average particle size D50 (volumetric basis) was measured using the following device and conditions.
Manufacturer: Spectris Co., Ltd. (Malvern Business Division)
Name of device: Dry particle image analyzer Morphologi G3
Measurement conditions:
Amount of particles introduced: 11 $mm^3$
Injection pressure: 0.8 bar
Range of measured particle size: 3.5-210 μm
Number of particles measured: 20000 particles
(Specific Surface Area)
The specific surface area of the pure copper powder was measured using the following device and conditions.
Manufacturer: Yuasa Ionics Co., Ltd.
Name of device: Monosorb
Measurement principle: Single Point BET
(Si Adhesion Amount)
Manufacturer: Seiko Instruments Inc.
Name of device: SPS3500DD
Method of analysis: ICP-OES (high frequency Inductively Coupled Plasma Optical Emission Spectrometry)
Amount of measured sample: 1 g
Number of measurements: Measurement was performed twice, and the average value thereof was used as the adhesion amount.
(C adhesion amount, O concentration)
Manufacturer: LECO JAPAN CORPORATION
Name of device: TCH600
Method of analysis: Inert gas fusion method
Amount of measured sample: 1 g
Number of measurements: Measurement was performed twice, and the average value thereof was used as the adhesion amount.
(WDX Analysis)
When Si is analyzed via WDX analysis, the ratio of portions that are 1/10 or more of a maximum signal strength within a whole particle is referred to as the "Si coverage". One particle is analyzed as a sample, and the Si coverage is measured by using the image processing function of WDX. Specifically, the entire screen of one particle on the WDX screen is scanned, and the Si signal strength is measured. However, since the back side of the particle cannot be scanned, more accurately, when the area of an image which views the particle from a single direction is deemed 100%, the area ratio of Si within that area (portions that are 1/10 or more of the maximum signal strength) is deemed the coverage.
Manufacturer: JEOL Ltd.
Name of device: FE-EPMA
Accelerating voltage: 15 kV
Output current: 15 µA
Scan speed: 10 mm/sec (Film Thickness of Si Coating)

The film thickness of the coating is a value obtained by sputtering the powder body surface at a fixed sputter rate, detecting the Auger electrons based on Auger Electron Spectroscopy (AES), and being calculated from the time and sputter rate required until Si is no longer detected. Two points are randomly selected as the locations to be detected from a single particle, and the value of the Examples represent the average value thereof.
Manufacturer: JEOL Ltd.
Name of device: AES (JAMP-7800F)
Filament current: 2.22 A
Probe voltage: 10 kV
Probe current: $1.0 \times 10-8$ A
Probe diameter: Approximately 500 nm
Sputtering rate: 7.2 nm/min ($SiO_2$ equivalent)

(Oxidation Resistance)

When a pure copper powder is exposed to the atmosphere, a natural oxide film is formed on the surface. When a pure copper powder with such an oxide film formed thereon is used in AM (additive manufacturing), there is a problem in that the reflectance or rate of absorption of the electron beam or laser will change, causing the thermal absorption to be different than that of a pure copper powder with no oxide film formed thereon, and physical properties such as the density of the molded object will vary and become unstable even when molding is performed under the same conditions. When an organic film containing Si is formed on the surface of the pure copper powder, the pure copper powder does not react easily with the moisture in the atmosphere, and it is thereby possible to suppress oxidation. In order to verify the inhibition of oxidation, the variation in the oxygen concentration after heating (150° C., 24 hours) the pure copper powder with a Si coating formed thereon was examined, and those in which the variation of oxygen concentration (after heating/before heating) was 5 or less were deemed favorable and given a circle (○), and those in which the variation of oxygen concentration (after heating/before heating) exceeded 5 were deemed inferior and given an x-mark (x).

(State of Powder after Temporary Sintering Test)

Since powder in which sintering has advanced due to heating will become a large size as a result of the powders bonding with each other, such powder cannot be passed through a sieve of a predetermined size. Accordingly, if a powder could pass through a sieve, it was judged that such powder exhibited the sintering inhibition effect caused by heating. In order to verify such sintering inhibition effect, 50 g of a pure copper powder was placed in a alumina crucible having a diameter of 50 mm, heated in an atmosphere having a degree of vacuum of $1 \times 10^{-3}$ Pa or less at 500° C. for 4 hours, whether the pure copper powder after heating could pass through a sieve having a sieve opening of 250 µm was confirmed, and powder that passed through the sieve was deemed favorable, and powder that could not pass through the sieve was deemed inferior.

(Change in Degree of Vacuum During Molding)

With a pure copper powder having a high C (carbon) ratio, a part of the organic coating would become decomposed due to the heat during the molding process, become gasified, and generate an unusual odor. Moreover, since the decomposed organic component will become dispersed within the device, the loss of the degree of vacuum will temporarily occur. In a low degree of vacuum, heating based on EB (electron beam) will be insufficient, and may lead to defects in the additive manufactured object. In order to verify the change in the degree of vacuum, those in which the degree of vacuum made a transition at $2.5 \times 10^{-3}$ Pa or less during the molding process were deemed favorable and given a circle (○), and those in which the degree of vacuum changed in excess of $2.5 \times 10^{-3}$ Pa were deemed inferior and given an x-mark (x).

(Relative Density)

A sample having a size of 20 mm×20 mm was cut out from the additive manufactured object, and the density thereof was measured with a commercially available Archimedes density measurement tool. The relative density was calculated by dividing the measured density by the theoretical density (8.93 g/cc in the case of Cu).

EXAMPLES

The present invention is now explained based on the following Examples and Comparative Examples. These Examples are illustrative only, and the present invention is not limited in any way based on the Examples. In other words, the present invention is limited only by the scope of its claims, and covers the various modifications other than the Examples included in the present invention.

Example 1, Comparative Example 1: Heat Treatment Temperature after Surface Treatment As the pure copper powder, a pure copper powder prepared via the atomization method and having an average particle size (D50) of 72 µm and a specific surface area of 0.024 m²/g was prepared, and this pure copper powder was immersed in a dilute sulfuric acid aqueous solution, and the natural oxide film on the surface thereof was removed. Next, after immersing the pure copper powder in a pure water-diluted coupling agent aqueous solution (5%) for 60 minutes, the pure copper powder was dried in a vacuum or an atmosphere at 70 to 120° C. After drying, the pure copper powder was subject to heat treatment in a vacuum at 550 to 800° C. (Examples 1-1, 1-2). Meanwhile, heat treatment was not performed in Comparative Examples 1-1, 1-2. A summary of the Si adhesion amount, Si coverage, Si coating thickness, C adhesion amount, and weight ratio C/Si of the pure copper powder with a coating formed thereon based on the foregoing treatment is shown in Table 1.

As a result of verifying the "oxidation resistance" of the foregoing pure copper powder with a coating formed thereon, variation in the oxygen concentration (after heating/before heating) was 5 or less in all cases, and it was confirmed that oxidation has been suppressed. Moreover, as a result of verifying the "state of powder after temporary sintering test", favorable results were obtained in all cases.

Next, the foregoing pure copper powder was used to produce an additive manufactured object based on the electron beam (EB) method. Here, as a result of measuring the "degree of vacuum during molding", while no change in the degree of vacuum was observed in Examples 1-1, 1-2, a change in the degree of vacuum was observed in Comparative Example 1-1. Moreover, while no change in the degree of vacuum was observed in Comparative Example 1-2, it was not possible to maintain a powder state after the temporary sintering test. Moreover, as a result of measuring the relative density of the molded object, the relative density was 95% or higher in all Examples and favorable results were obtained. The foregoing results are shown in Table 1.

TABLE 1

| | Metal powder | Particle size (μm) | Specific surface area (m²/g) | Surface treatment agent | Treatment concentration (%) | Treatment time (min) | Heat treatment temperature (° C.) | Heat treatment temperature after surface treatment (° C.) | Si adhesion amount (wtppm) | Si coverage (%) |
|---|---|---|---|---|---|---|---|---|---|---|
| Example 1-1 | Cu | 72.0 | 0.024 | Diaminosilane | 5 | 60 | 25 | 550 | 66 | — |
| Example 1-2 | | | | | | | 25 | 800 | 64 | 45 |
| Comparative Example 1-1 | | | | | | | 25 | No heat treatment | 64 | — |
| Comparative Example 1-2 | | | | | | | 25 | No heat treatment | 2 | — |

| | Si coating thickness (nm) | C adhesion amount (wtppm) | Weight ratio C/Si | Oxygen concentration (wtppm) | Variation in oxygen concentration (after heating)/(before heating) | State of powder after temporary sintering test | Change in degree of vacuum during molding | Relative density of molded object (%) | Si concentration of molded object (wtppm) |
|---|---|---|---|---|---|---|---|---|---|
| Example 1-1 | — | 130 | 2.0 | 170 | ○ | Favorable | ○ | 96 | — |
| Example 1-2 | 40 | 90 | 1.4 | 160 | ○ | Favorable | ○ | 99 | 26 |
| Comparative Example 1-1 | — | 210 | 3.3 | 310 | ○ | Favorable | x | 88 | — |
| Comparative Example 1-2 | — | 10 | 5 | 110 | — | Inferior | ○ | — | — |

Example 2: Particle Size of Pure Copper Powder

As the pure copper powder, a pure copper powder prepared via the atomization method and having an average particle size (D50) of 38 μm was prepared, and this pure copper powder was immersed in a dilute sulfuric acid aqueous solution, and the natural oxide film on the surface thereof was removed. Next, after immersing the pure copper powder in a pure water-diluted diaminosilane aqueous solution (5%) for 60 minutes, the pure copper powder was dried in a vacuum or an atmosphere at 70 to 120° C. After drying, the pure copper powder was subject to heat treatment in a vacuum at 800° C. (Example 2-1).

A summary of the Si adhesion amount, Si coverage, Si coating thickness, C adhesion amount, and weight ratio C/Si of the pure copper powder with a coating formed thereon based on the foregoing treatment is shown in Table 2.

As a result of verifying the "oxidation resistance" of the pure copper powder with a Si coating formed thereon, variation in the oxygen concentration (after heating/before heating) was 5 or less in all cases, and it was confirmed that oxidation has been suppressed. Moreover, as a result of verifying the "state of powder after temporary sintering test", favorable results were obtained in all cases. The foregoing results are shown in Table 2.

TABLE 2

| | Metal powder | Particle size (μm) | Specific surface area (m²/g) | Surface treatment agent | Treatment concentration (%) | Treatment time (min) | Heat treatment temperature (° C.) | Heat treatment temperature after surface treatment (° C.) | Si adhesion amount (wtppm) | Si coverage (%) |
|---|---|---|---|---|---|---|---|---|---|---|
| Example 2-1 | Cu | 38 | — | Diaminosilane | 5 | 60 | 25 | 800 | 140 | — |

| | Si coating thickness (nm) | C adhesion amount (wtppm) | Weight ratio C/Si | Oxygen concentration (wtppm) | Variation in oxygen concentration (after heating)/(before heating) | State of powder after temporary sintering test | Change in degree of vacuum during molding | Relative density of molded object (%) | Si concentration of molded object (wtppm) |
|---|---|---|---|---|---|---|---|---|---|
| Example 2-1 | — | 210 | 15 | 420 | — | ⚡ | — | — | — |

INDUSTRIAL APPLICABILITY

According to the embodiments of the present invention, it is possible to suppress the partial sintering of the pure copper powder caused by the preheating thereof in additive manufacturing based on the electron beam (EB) method, and suppress the generation of discoloration and contamination of the additive manufacturing device caused by carbon (C). Consequently, superior effects are yielded in that it is possible to produce an additive manufactured object of a complex shape (hollow structure, etc.), and, when a pure copper powder layer is formed but there are portions that were not irradiated with an electron beam, such portions can be reused. The pure copper powder according to the embodiments of the present invention is particularly useful as a pure copper powder for use in a metal 3D printer.

The invention claimed is:

1. A pure copper powder with a Si coating formed thereon, wherein a Si adhesion amount is 5 wtppm or more and 200 wtppm or less, a C adhesion amount is 15 wtppm or more, and a weight ratio C/Si of the Si adhesion amount and the C adhesion amount is 3 or less.

2. The pure copper powder according to claim 1, wherein an average particle size D50 (median diameter) of the pure copper powder is 10 μm or more and 150 μm or less.

3. A production method of the pure copper powder according to claim 1, wherein a pure copper powder is immersed in a solution containing a silane-based coupling agent, and, after forming a Si coating on the pure copper powder, the pure copper powder is heated at 400° C. or higher and 1000° C. or less.

4. The pure copper powder according to claim 1, wherein an oxygen concentration in the pure copper powder is 1000 wtppm or less.

5. The pure copper powder according to claim 4, wherein an average particle size D50 (median diameter) of the pure copper powder is 10 μm or more and 150 μm or less.

6. A production method of the pure copper powder according to claim 5, wherein a pure copper powder is immersed in a solution containing a silane-based coupling agent, and, after forming a Si coating on the pure copper powder, the pure copper powder is heated at 400° C. or higher and 1000° C. or less.

7. A pure copper powder with a Si coating formed thereon, wherein, when Si is analyzed via WDX analysis, portions that are 1/10 or more of a maximum signal strength are 40% or higher of a whole particle, a C adhesion amount is 15 wtppm or more, and a weight ratio C/Si of a Si adhesion amount and a C adhesion amount is 3 or less.

8. The pure copper powder according to claim 7, wherein an average particle size D50 (median diameter) of the pure copper powder is 10 μm or more and 150 μm or less.

9. A production method of the pure copper powder according to claim 7, wherein a pure copper powder is immersed in a solution containing a silane-based coupling agent, and, after forming a Si coating on the pure copper powder, the pure copper powder is heated at 400° C. or higher and 1000° C. or less.

10. The pure copper powder according to claim 7, wherein an oxygen concentration in the pure copper powder is 1000 wtppm or less.

11. The pure copper powder according to claim 10, wherein an average particle size D50 (median diameter) of the pure copper powder is 10 μm or more and 150 μm or less.

12. A production method of the pure copper powder according to claim 11, wherein a pure copper powder is immersed in a solution containing a silane-based coupling agent, and, after forming a Si coating on the pure copper powder, the pure copper powder is heated at 400° C. or higher and 1000° C. or less.

13. A pure copper powder with a Si coating formed thereon, wherein a film thickness of the Si coating is 5 nm or more and 300 nm or less, a C adhesion amount is 15 wtppm or more, and a weight ratio C/Si of a Si adhesion amount and a C adhesion amount is 3 or less.

14. The pure copper powder according to claim 13, wherein an average particle size D50 (median diameter) of the pure copper powder is 10 μm or more and 150 μm or less.

15. A production method of the pure copper powder according to claim 13, wherein a pure copper powder is immersed in a solution containing a silane-based coupling agent, and, after forming a Si coating on the pure copper powder, the pure copper powder is heated at 400° C. or higher and 1000° C. or less.

16. The pure copper powder according to claim 13, wherein an oxygen concentration in the pure copper powder is 1000 wtppm or less.

17. The pure copper powder according to claim 16, wherein an average particle size D50 (median diameter) of the pure copper powder is 10 μm or more and 150 μm or less.

18. A production method of the pure copper powder according to claim 17, wherein a pure copper powder is immersed in a solution containing a silane-based coupling agent, and, after forming a Si coating on the pure copper powder, the pure copper powder is heated at 400° C. or higher and 1000° C. or less.

* * * * *